UNITED STATES PATENT OFFICE.

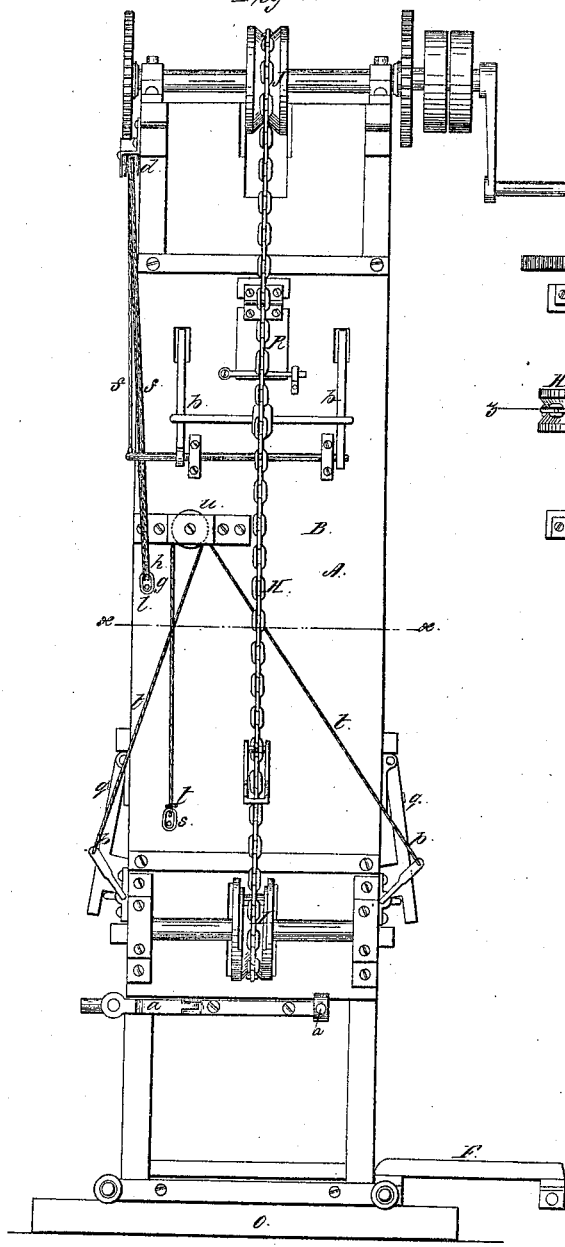

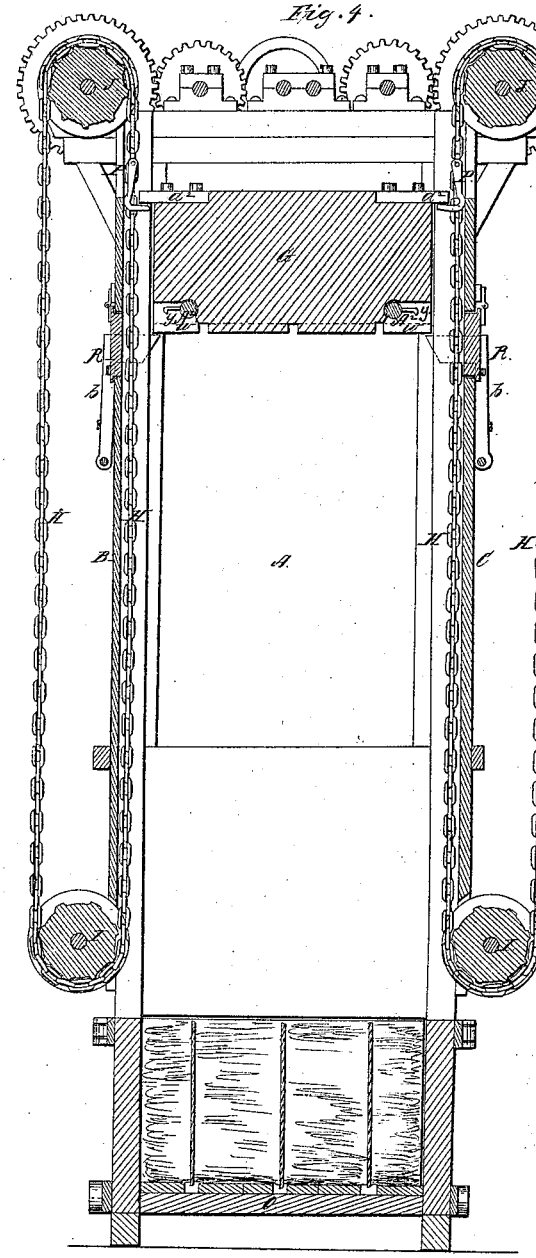
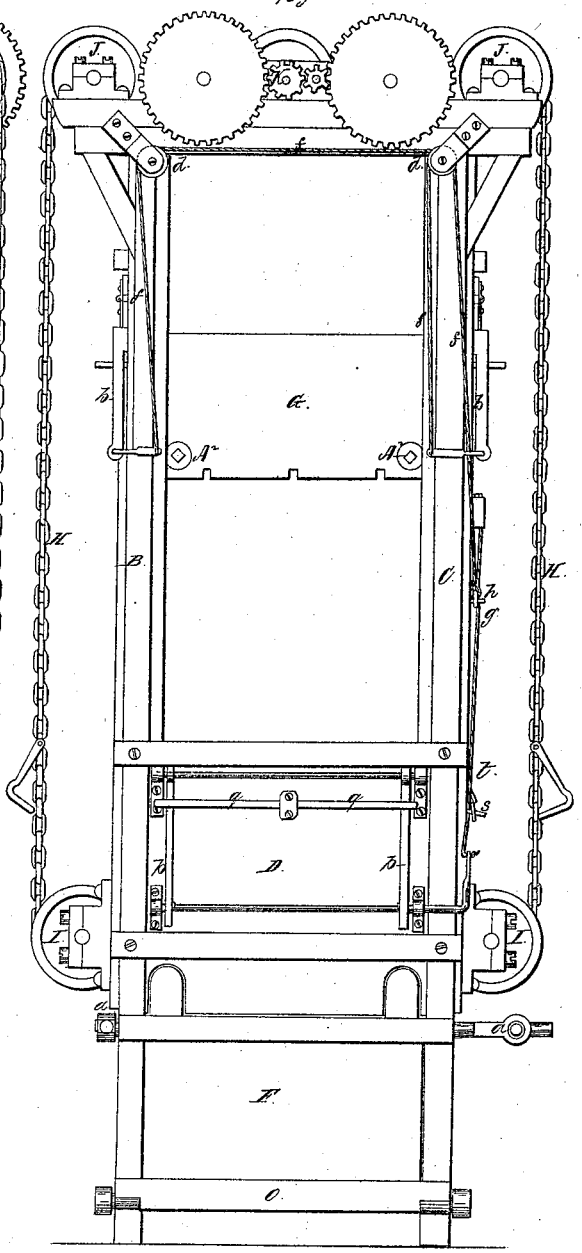

S. R. DUMMER, OF NEW YORK, N. Y.

IMPROVED BEATER-PRESS.

Specification forming part of Letters Patent No. 52,275, dated January 30, 1866.

*To all whom it may concern:*

Be it known that I, S. R. DUMMER, of the city, county, and State of New York, have invented a new and Improved Beater-Press; and I do hereby declare that the following is a full, clear, and exact description thereof, which will enable others skilled in the art to make and use the same, reference being had to the accompanying drawings, forming part of this specification.

The present invention relates to that class of presses used for pressing hay, cotton, wool, and other analogous substances, commonly known as a "beater-press;" and it consists, principally, in raising the drop-weight by the falling of which the hay or other material placed in the press is compressed into the form of a bale by means of hooks so hung at the proper points of endless traveling chains or belts passing around suitable pulleys or drums at the lower and upper portions of the upright box or framing in which the drop-weight moves that, as such chain-hooks at corresponding points of the endless chains pass around the lower pulleys and have commenced and are on their upward travel or movement, they will engage with the drop-weight, suitably constructed therefor, and, carrying it along with them, raise or lift it up, when, the drop having reached the desired height, the chain-hooks are then automatically disengaged therefrom, leaving it free to fall with its full weight and all its force accumulated during such fall upon the hay or whatever other material has been placed in the press, beating down the same, upon which it then rests until the said chain-hooks again come round, or another set correspondingly hung upon the same chains again engage with the drop and lift it, from which they are released, as before, when at the desired height, leaving the drop free again to fall, still further beating and compressing the hay or other material in the press, and so on until the material is compressed to the required degree, when securing the drop in the upper portion of the press, for which a suitable arrangement of catches are provided. The bale, after being tied or secured by any proper means, is then removed from the press, when the press is then made ready for another operation similar to that above explained.

In addition to the above, I have also made other improvements in the arrangement and construction of the various parts composing the beater-press which are quite important to its successful operation, as will be apparent from the following detail description of the press, reference being had to the accompanying plates of drawings, of which—

Figure 1, Plate 1, is an elevation of one side of the beater-press; Fig. 2, same plate, a plan or top view; and Fig. 3, a transverse horizontal section taken in the plane of the line $x\,x$, Fig. 1; Fig. 4, Plate 2, a central vertical section taken in the plane of the line $y\,y$, Fig. 2, Plate 1; and Fig. 5, same plate, a front elevation of the press.

Similar letters of reference indicate like parts.

A in the drawings represent the upright box or frame of the press, which is made of a square shape in horizontal section, and closed or boarded up upon its two sides B and C for its entire height, but only at the lower portions of its front and rear sides, D and E, a similar door, E, being hung in both the front and rear sides of the press, so as to swing downward, catches $a\,a$ upon the sides B and C holding them up and against the press-frame when swung up; G, the drop, the weight of which is to be either more or less according to the requirements of the purpose for which the press is to be used, which drop is placed within the box or frame A of the press, so as to play loosely up and down therein guided by its sides.

H H two endless chains, one upon each side B and C of the press, passing respectively around pulleys I I a short distance from the bottom or lower end of the press and pulleys J J at or near its upper end, which chains, through a train or series of suitably-arranged gear-wheels, K, upon the top of the press, connected with the driving power used, are made to travel up and down with a uniform and similar rate of movement around the said pulleys, the chain in its upward line of movement passing inside of the sides B C, as plainly shown in Fig. 4, Plate 2. Upon each of these chains H H, and at similar points, are hung two swinging hooks, L L, in such a manner that, as they pass around the lower pulleys, J J, and are commencing their upward movement, they will engage with the projecting lugs or arms $a^2\,a^2$ upon the upper side of the drop G, and thus lift and carry it up with them, the said hooks as they thus pass upward being held in connection with the said drop-lugs $a^2$ by bearing against the inside of the side boards, B C, as seen in Fig. 4, Plate 2, when, having reached the desired height, by removing such portion of the side boards, B C, as are at that height, the hooks will immediately swing out, disengaging themselves from the weight-lugs, thus setting the drop free, when it falls through the press down upon the hay or whatever other material may have been placed in its lower portion upon its foundation or bed-plate O, beating down the same by the force of such fall, while at the same time the chains continue their movement around the pulleys. The drop then rests upon the hay in the press upon which it has just acted until the chain-hooks again engage with it, as before, and raise it up, leaving it free again to fall, when at the desired height, upon the hay, to still further beat or compress it into a compact form or other shape, which operation is continued until the hay has been compressed to the requisite degree, when, throwing the spring-catches $b\ b$ upon each side of the press and at or near its upper end under the drop, the drop cannot then fall, as it rests upon them. The compressed hay in the press can then be removed therefrom by pushing it through one of the doors F, both of which for that purpose being opened, the hay, however, being first tightly bound with ropes or other suitable fastenings, as will be presently explained. These spring-catches $b$ are so situated with regard to the upper openings, P, through and by which the chain-hooks are allowed to relieve themselves of the drop, as above explained, that when the drop is resting upon them the chain-hooks can freely pass by the lugs upon the drop without necessitating the stopping of the press—a quite important advantage in the successful operation of the press.

To simultaneously release the spring-catches $b\ b$ from the drop, when so desired, I connect them all together through a series of pulleys, $d\ d\ d$, upon the outside of the press and connecting-cords $f\ f$, in such a manner that by pulling the handle $g$ on one end $h$ of the cords $f$ they will be drawn out and away from the drop, where, by securing such handle $g$ upon a fixed pin, $l$, they are held, this handle simply being released from the said pin $l$ if the said catches are to be used for holding the weight elevated, when the springs connected with them throw them under the drop, as is obvious without further explanation.

In order that the height to which the drop is to be raised by the chain-hooks can be regulated at pleasure, and thus the drop allowed to fall from any height desired, I intend to make in the sides of the box against which the chain-hooks bear as they move upward, as explained, a series of openings or doors, one of which is shown at R in the drawings, so that by opening such doors as are at the height from which it is desired the drop should fall the hooks can there disengage themselves from the drop, leaving it free to fall, the chain-hooks continuing their movement the same as before explained, when, having passed around to the weight, they again engage with it, raising it as before, and so on.

Upon each chain there are two of the drop-lifting hooks, so that the drop will be lifted twice in one movement of the length of the chains, the hooks, however, being at such a distance from each other that the fall of the drop (whether from the highest or lowest point to which the press is adapted) can take place without injury to the hooks, the advantage secured by the use of two hooks upon the chains being manifest.

In order to prevent the rebound of the drop as it strikes the material in the press, I have arranged upon the back and front sides of the same spring catches or pawls $p\ p$, the inner ends of which are of such a form as to allow the drop to freely pass by them without impeding its movement, their springs $q\ q$, however, causing them to instantly swing into position above the drop, thereby preventing it from rebounding, from which, when the drop is at rest, they are withdrawn by pulling the handle S of the cord $t$, passing over pulleys $u$ and suitably connected with both sets of spring-catches $p$, so as to simultaneously move them.

In order to more fully secure the retention of the drop and prevent it from rebounding after having struck the material in the press, a series of notches may be made in the sides of the drop, at suitable points thereof, in line with the said spring-catches $p\ p$, so that they can engage with the drop and hold it from rebounding whether the drop strikes the hay at a greater or lesser distance from the bottom of the press.

From the above description it is plainly manifest that with my improved beater-press hay, cotton, wool, or any other analogous materials may be compressed into a very compact form, the lifting of the drop being accomplished in a simple and direct manner, and the press, as is obvious, possessing many important advantages.

When hay is pressed into the form of a bale it is generally the practice, in addition to the binding-cords passed around the hay-bale, to retain it in such form, to use upon the upper and lower sides of the bale a series of wooden cleats or strips, over which the said cords pass and tightly hold them in position, to enable which cleats to be secured to the bale upon its upper side, or that on which the drop rests before removing the bale from the press, I form in the under side of the drop a series of parallel grooves, $w\ w$, said grooves extending in the direction of the length of the bale or drop, and of such a depth that when the bale-cleats are laid therein and secured by setting the clutches $y\ y$ of each groove $w$ in each end of the cleats they will not project beyond the striking face or surface of the drop, the several clutches at each end of the grooves $w$ being connected to a common shaft, $A^2$, thereat, one end of which is made of a square shape, so as to allow a key to be used upon it to turn it. By thus holding the bale-cleats in the drop below its striking-surface no injury can result to them by the operation of the drop upon the material in the press, while at the same time, with the drop resting upon the hay-bale, they can be released from the weight and dropped upon the bale, to and on which they are then firmly and tightly secured and held by passing the binding-cords around the bale in the same manner as it is now done, the cleats for the lower side of the bale being simply laid upon the bottom of the press, together with the binding-cords, before placing the hay or other material therein.

In lieu of the projecting lugs or arms upon the drop for the chain-hooks to engage with and by which they lift it, suitable notches may be made in the ends of the drop for the hooks to engage with, or the drop may be constructed in many ways to allow it to be raised by the chain-hooks, as explained, and therefore I do not intend to limit myself to any one particular form or construction of the drop for such purpose.

I claim as new and desire to secure by Letters Patent—

1. Providing the sides of the press with openings which admit of the hooks slipping away from the weight so as to disengage the latter or pass it, as the case may be.

2. The arrangement of the endless chains or belts H H, having hooks L L, and drop-weight G upon and within a suitable upright box or casing, A, having openings P and R at proper points of its sides, against which the chain-hooks bear, substantially as herein described, and so as to operate in the manner specified.

3. So arranging the spring-catches $b\ b$ by which the drop-weight is held elevated with regard to any one of the openings in the press-box for the escape of the chain-hooks from the drop that when engaged with the weight to retain it in position the said hooks can freely pass by the weight, thus not necessitating the stopping of the motion of the chains, substantially as described.

4. The arrangement of the mechanism for disengaging the lower pawls, $p\ p$, consisting of the cords $t\ t$, connected to the rock-shafts $p'\ p'$, operated as described.

5. The arrangement of the cords $f\ f$, pulleys $d\ d$, and rock-shafts $p''\ p''$, for the disengagement of the upper pawls, $b\ b$, to release the weight, substantially as described and represented.

6. Forming grooves or recesses in the striking-surface of the drop-weight for receiving the wooden cleats or strips, such as are used in the baling of hay, which grooves are of such depth that the cleats will not project beyond the face of the drop, and have any suitable arrangement of clutches for holding the said cleats therein, substantially as and for the purpose described.

The above specification of my invention signed by me this 12th day of October, 1865.

SAML. R. DUMMER.

Witnesses:
M. M. LIVINGSTON,
ALBERT W. BROWN.